United States Patent [19]

Bass

[11] Patent Number: 5,753,810
[45] Date of Patent: May 19, 1998

[54] METHOD AND APPARATUS FOR DETERMINING TIRE INFLATION STATUS

[75] Inventor: Ronald Marshall Bass, Houston, Tex.

[73] Assignee: Shell Oil Company, Houston, Tex.

[21] Appl. No.: 790,634

[22] Filed: Jan. 29, 1997

[51] Int. Cl.$^6$ ............................................. B60C 23/02
[52] U.S. Cl. ............................. 73/146.3; 73/146.2
[58] Field of Search ........................... 73/146, 146.2, 73/146.3, 146.4, 146.5

[56] References Cited

U.S. PATENT DOCUMENTS

| | | | |
|---|---|---|---|
| 2,126,327 | 8/1938 | Hendel et al. | 73/31 |
| 2,313,156 | 3/1943 | Kratt | 73/51 |
| 2,663,009 | 12/1953 | Finan | 340/58 |
| 3,715,720 | 2/1973 | Jehle | 340/58 |
| 3,878,712 | 4/1975 | Chapin | 73/146 |
| 3,973,436 | 8/1976 | Lenderman | 73/146 |
| 5,289,718 | 3/1994 | Mousseau | 73/146 |
| 5,396,817 | 3/1995 | Rosensweig | 73/146.2 |
| 5,445,020 | 8/1995 | Rosensweig | 73/146.2 |

FOREIGN PATENT DOCUMENTS 4019317  12/1991  Germany ......................... 73/146

OTHER PUBLICATIONS

"A Path of Least Resistance", by Dennis Simanaitis, Road & Track, Jun. 1995.

*Primary Examiner*—George M. Dombroske
*Assistant Examiner*—Max H. Noori
*Attorney, Agent, or Firm*—Kim Muller

[57] ABSTRACT

The automatic tire inflation status measurement system comprises a scale and a tire-deformation apparatus for automatically determining whether a pneumatic tire installed on a vehicle is underinflated. The scale plate is flush mounted with the road surface and measures the weight on the tire as the tire rolls across the plate. A second weight measurement is made by using a deformation bar which projects slightly above the road surface and causes the tire to deform as it rolls over the bar. Both the scale and deformation bar are connected to load cells, preferably the same load cells. The tire deforms as it rolls across the bar and weight on the bar vs time is measured by the load cells. Data from the load cells is collected by, for example, using a summing amplifier and a computer-operated data acquisition board. The peak reading on the scale and the peak value of the bar reading are used to calculate a ratio. This ratio is then compared to a threshold value to determine whether the tire is underinflated. The result of this analysis is communicated to the vehicle driver, for example, by an electronically controlled display, such as a visual message display, computer speech generator or printer output, connected to the computer.

20 Claims, 14 Drawing Sheets

METHOD AND APPARATUS FOR DETERMINING TIRE INFLATION STATUS

BACKGROUND OF THE INVENTION

1. Field of the Invention

The invention is related to a method and apparatus for determining the inflation status of a vehicle pneumatic tire as the tire rolls over the apparatus and while the tire is attached to the vehicle. Access to the tire valve stem is not required.

2. Description of Related Art

U.S. Pat. Nos. 5,445,020 and 5,396,817 issued to Rosensweig disclose tire inflation sensors for making a series of point measurements and determining the pressure of a pneumatic tire mounted on a vehicle. The sensors are load cells mounted flush with the roadbed, i.e., there is no bar and thus no deformation of the tire other than that naturally occurring due to the load carried by the tire. Tire pressure distribution on the road surface is used, not total weight.

U.S. Pat. No. 2,126,327 to Hendel et al. does not use car weight in its analysis and does not use a bar. It makes some measurement of tire "force" distributed between a bladder and the surrounding road surface, but the bladder is not elevated above the roadbed. Rather, it is recessed, so tire deformation is not used in the process and total tire weight is not used.

U.S. Pat. No. 2,663,009 to Finan discloses a system for making an on-vehicle measurement of tire softness, not a road surface measurement. Something like a bar is used, but it does not measure total weight. This system can be calibrated for the specific tire on the specific vehicle whereas Applicant's invention will accommodate a wide variety of tires and vehicles.

U.S. Pat. No. 2,313,156 to Kratt, Jr., measures the force profile across the tire, the same approach used in the Rosensweig patents. Tire deformation is not used and total tire weight is not used.

U.S. Pat. No. 3,715,720 to Jehle involves depressing a probe (point measurement as opposed to across the whole tire) which is maintained at a specified force. Total weight is not used.

In U.S. Pat. No. 3,973,436 to Linderman, force distribution across the tire is measured, similar to U.S. Pat. No. 2,313,156. Neither a bar nor total weight is used.

U.S. Pat. No. 5,289,718 to Mousseau discloses a method for measuring the force exerted by the tire in going over a step. It does not use a bar or total weight, and is not intended for underinflation measurement but for measurement of tire force on rough surfaces. No means is described for extracting inflation-related information.

SUMMARY OF THE INVENTION

The automatic tire inflation status measurement system comprises a scale and a tire-deformation apparatus for automatically determining whether a pneumatic tire installed on a vehicle is underinflated. The scale plate is flush mounted with the road surface and measures weight on the tire as the tire rolls across the plate. A second measurement is made by using a deformation bar which projects slightly above the road surface and causes the tire to deform as it rolls over the bar. Both the scale and deformation bar are connected to load cells, preferably the same load cells. The tire deforms as it rolls across the bar and weight on the bar vs. time is measured by the load cells. Data from the load cells is collected by, for example, using a summing amplifier and a computer-operated data acquisition board. The peak scale reading and the peak value of the bar reading are used to calculate a ratio. This ratio is then compared to a predetermined threshold value to determine whether the tire is underinflated. The result of this analysis is communicated to the vehicle driver, for example, by an electronically controlled display, such as a computer speech generator or printer output connected to the computer.

DESCRIPTION OF THE PREFERRED EMBODIMENTS

The following description is made with reference to only one side of a vehicle. It will be appreciated that the preferred and most efficient embodiment of the invention will include two identical systems per FIG. 1A in order that the status of all four tires can be determined in a single pass.

Figure 1A:
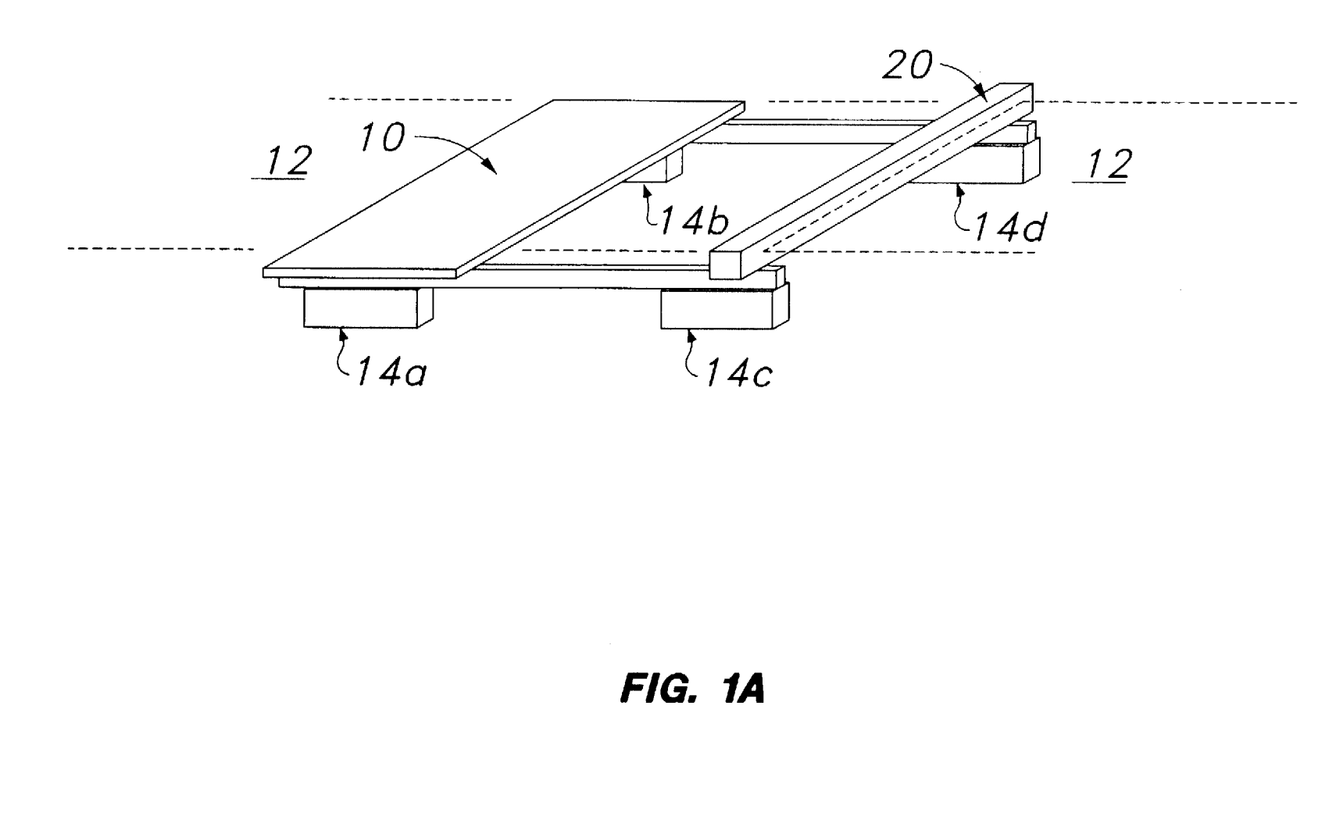
FIG. 1A is a schematic view of the mechanical components of the invention.
Figure 1B:
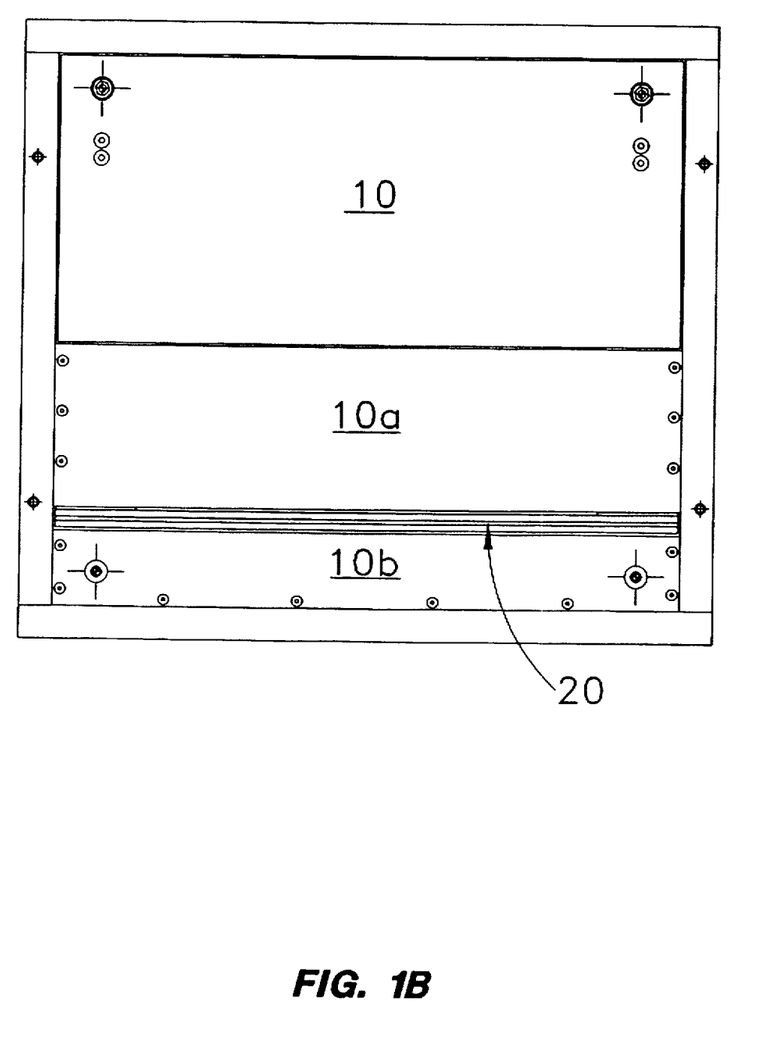
FIG. 1B is a plan view of the components of FIG. 1A.
Figure 1C:
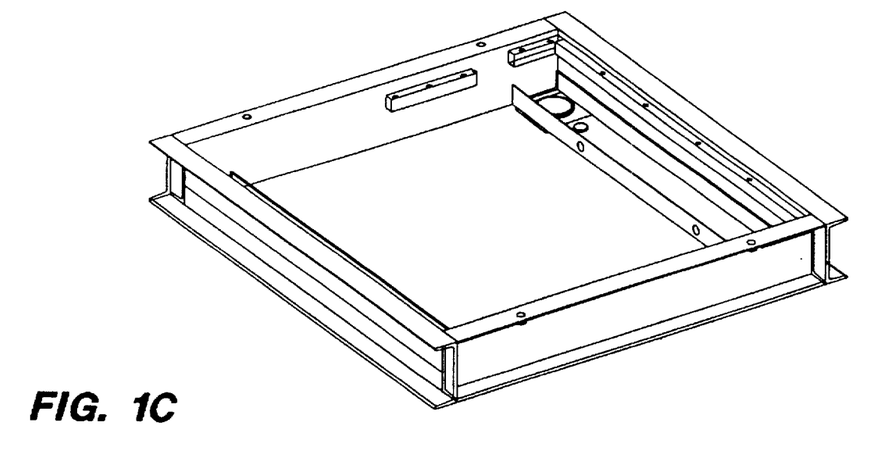
FIGS. 1C-1E are three-dimensional views of the frame assembly, the weight assembly, and the cover plate assembly, respectively, for the system of FIG. 1A.

Referring to FIG. 1A, a scale plate 10 is placed on a road surface 12. The road surface 12 is preferably the apron of an automobile service station, car wash, etc., with the scale plate 10 being situated such that an automobile can be driven over it when the driver desires some service such as fuel or a car wash. The plate 10 is flush with the road surface 12 and is supported by load cells 14a, 14b, 14c and 14d which, when deflected by the weight of the vehicle as the tire rolls over it, generate voltages from their strain gauges. These signals from the strain gauges are transmitted to a load cell summer 40 (see FIG. 3), which adds together the signals from the four load cells. The maximum reading of the load cell summer 40 output from the scale is used for computations and is denoted as "Y." FIG. 1B shows a plan view of the scale of FIG. 1A with covers in place, including center plate 10a and exit cover 10b, and deformation bar 20.

Situated proximate to, and preferably in the same tire-travel path with, scale plate 10 is a deformation bar 20 also supported by load cells, preferably the same load cells 14a, 14b, 14c and 14d used for the scale plate 10 measurements. As the tire rolls over the deformation bar 20 (see FIGS. 2A and 2B), voltages are generated by the load cell strain gauges. These voltages are transmitted to the load cell summer 40 and undergo the same type of transformation as did the signals from the scale. The maximum reading of the load cell summer 40 from the bar is used for computation and is denoted as "X." The analog outputs from the load cell summer 40 are input to the computer 60 via an analog-to-digital (A/D) converter 45. The maximum values X and Y are determined by the computer 60.

Figure 2A:
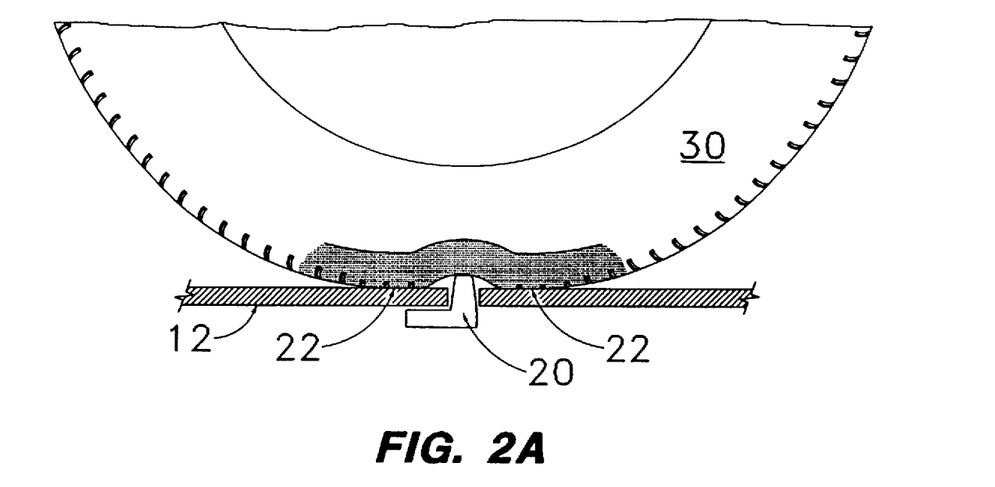
FIG. 2A is a conceptual view of the tire deformation of an underinflated tire as it rolls across a raised bar.
Figure 2B:
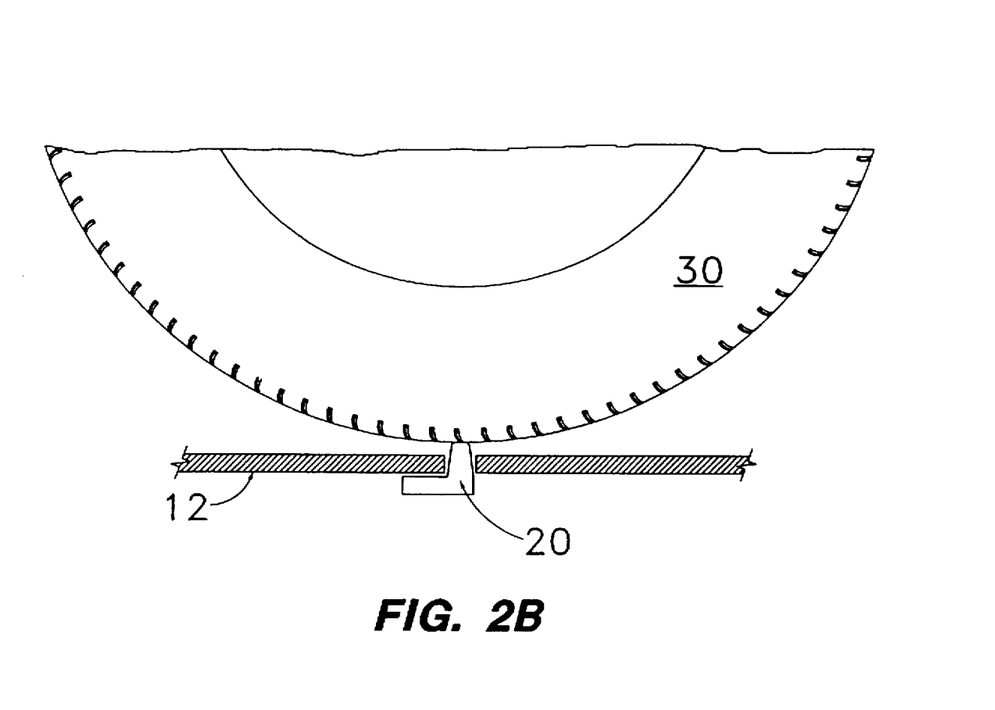
FIG. 2B is a conceptual view of the tire deformation of a properly inflated tire as it rolls across a raised bar.
Figure 3:
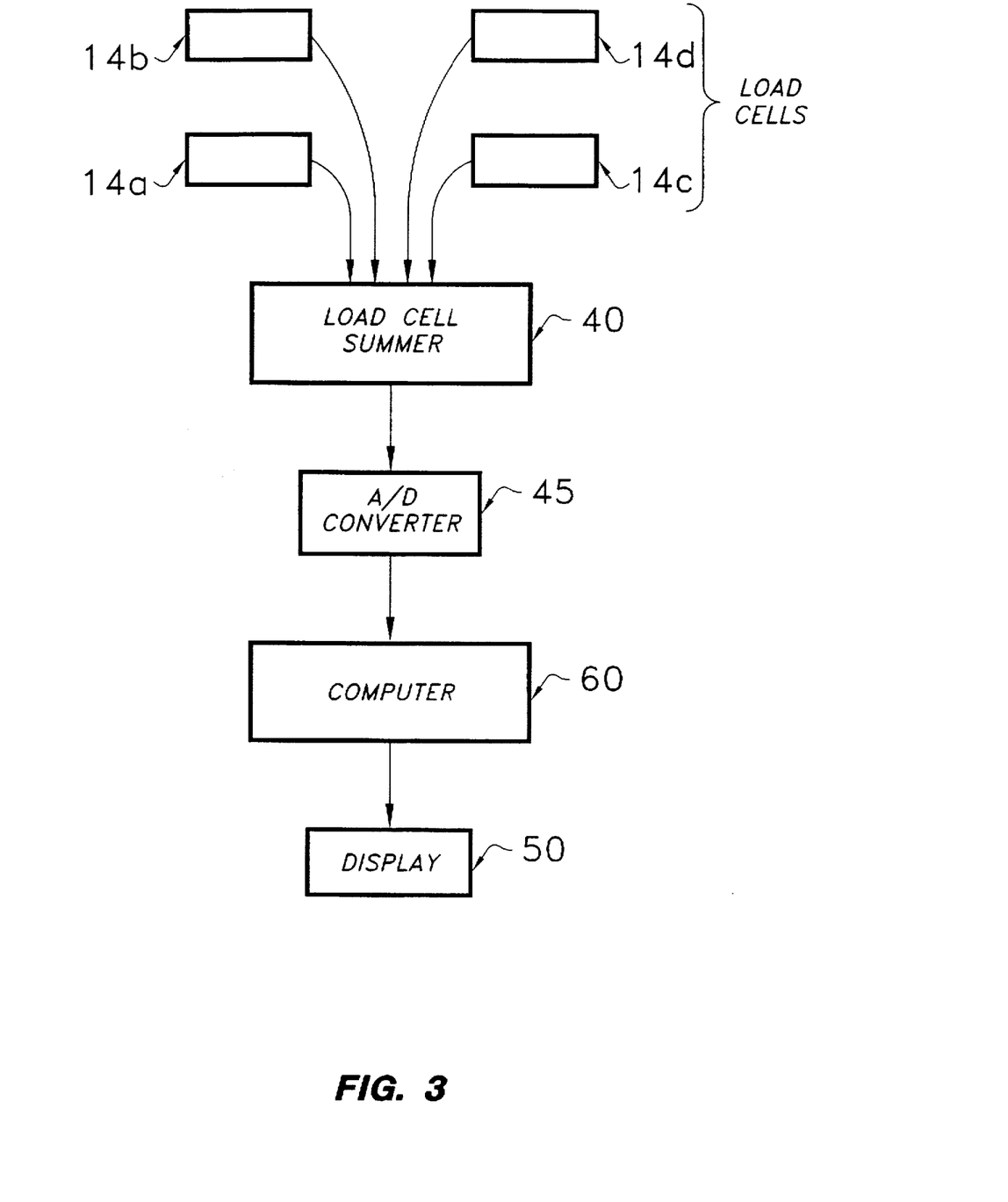
FIG. 3 is a block diagram of the data generating, converting and gathering components required by the invention.

The deformation bar 20 protrudes slightly above the road surface 12 such that, as shown in FIG. 2A, an underinflated tire deforms to such an extent that the tread of the tire 30 touches the road surface 12 on either side of the bar 20 such as at the touch points 22. Thus, some of the load on the tire 30 is supported by the road surface at touch points 22 and some of the load is supported by the bar 20. The deformation of a properly inflated tire 30 is shown in FIG. 2B which shows the tire 30 completely supported by the bar 20 with no portion of the tire 30 touching, and being supported by, the road surface 12. In actual practice, a properly inflated tire carrying a heavy load may, in fact, touch the road surface as discussed below.

Figure 10:
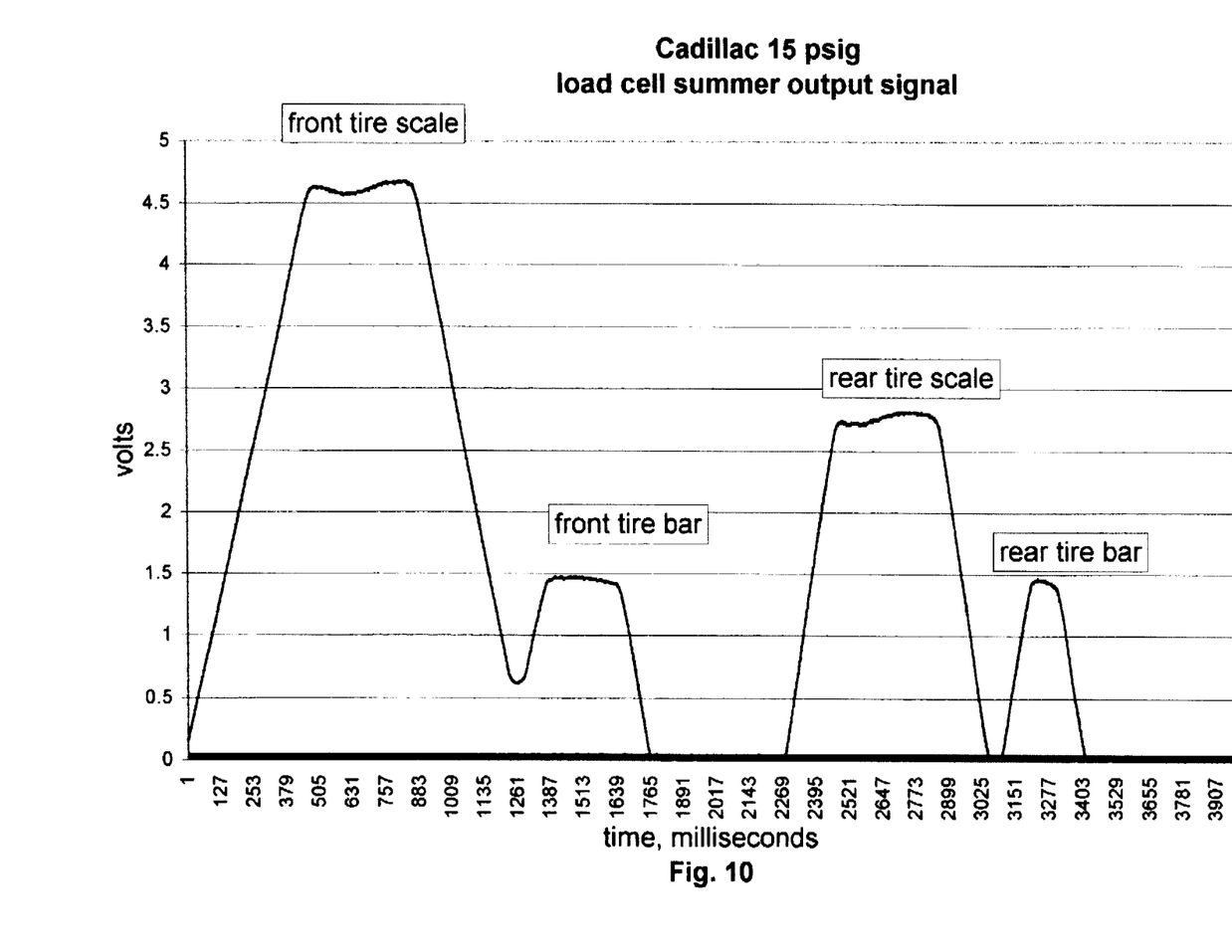
FIG. 10 is a graph of the load cell summer output voltage vs time of a Cadillac with low (15 psig) pressure in the front tire, wherein the signal has only three peaks because the front tire straddles the scale and the bar at the same time.
Figure 11:
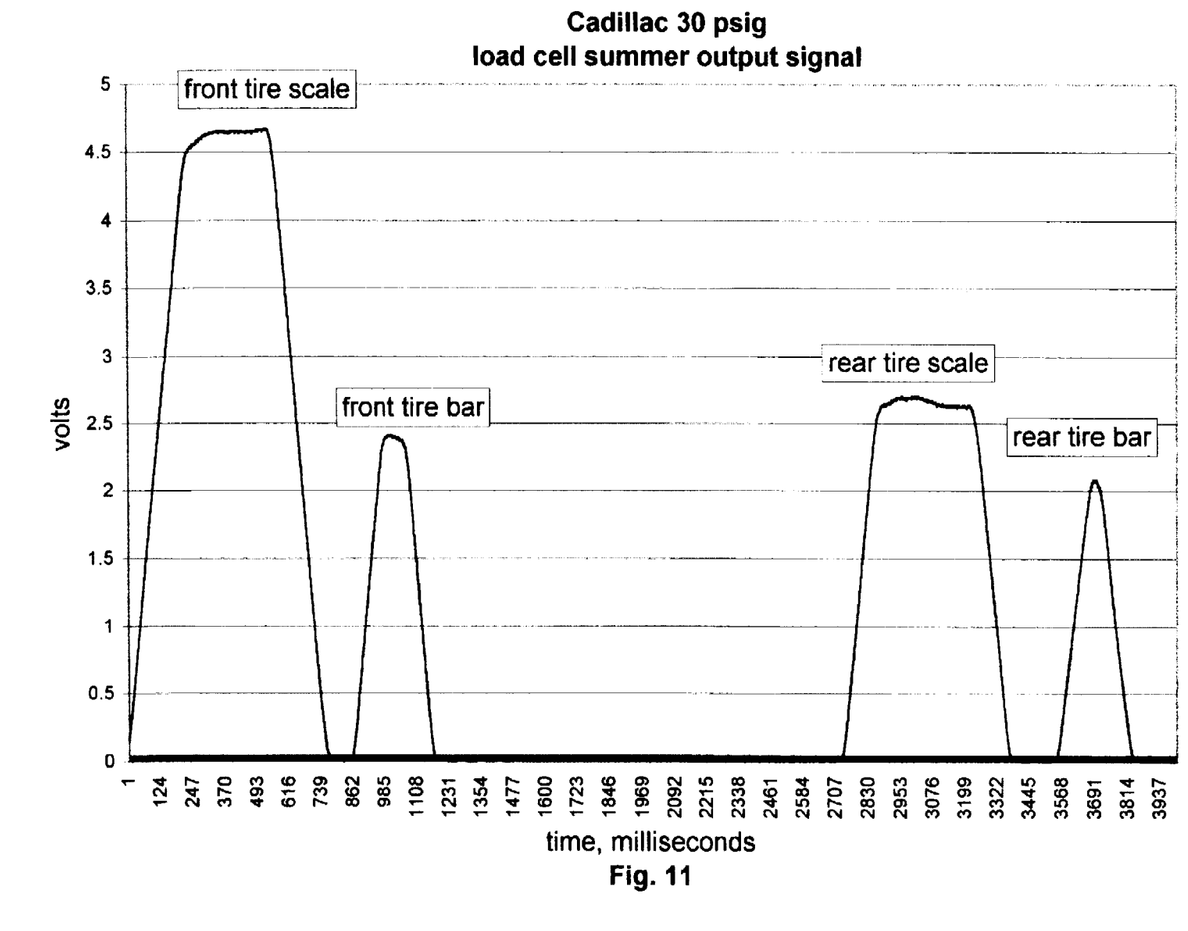
FIG. 11 is a graph, analogous to FIG. 10, of the load cell summer output vs time for a Cadillac with both tires at high pressure (30 psi), wherein the signal has four peaks because the tires are never on the bar and the scale at the same time.

For a properly inflated tire, the signal from the load cell summer 40 from each side of the car consists of four sequential separated peaks: a scale 10 peak for the front tire, a bar 20 peak for the front tire, a scale 10 peak for the rear tire, and a bar 20 peak for the rear tire. These peaks are shown in FIG. 11. If the tire pressure is low enough, the bottom of the tire broadens out in the direction of travel and does not completely clear the scale plate 10 before reaching the bar 20. In this case, there will be fewer than four peaks. FIG. 10 shows an example for a Cadillac with both tires at 15 psig. The front tire peaks are smeared together so that there are a total of three peaks. If both front and rear tires are low enough, there will be only two smeared peaks and no separated peaks.

If the computer 60 detects only two or three peaks, it is assumed that some tires on the car are low. If this is all the information desired, it is not necessary to calculate ratios. Optionally, the computer 60 can tell whether the front or rear tire, or both, has the smeared peaks by comparing the width of the peaks near the bottom. The smeared peaks are much wider than the separated peaks.

Figures 1D, 1E:
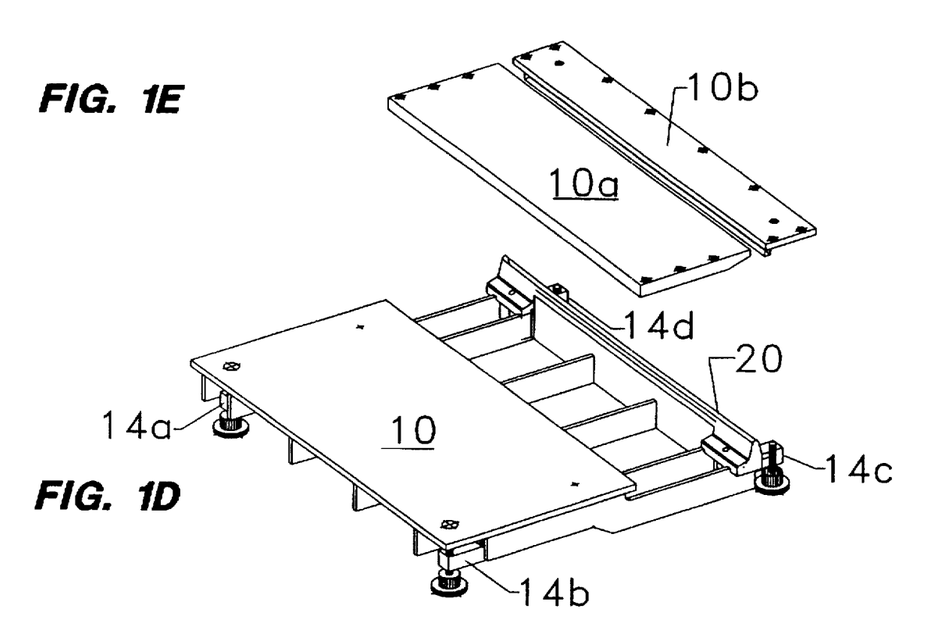
Figure 1F:
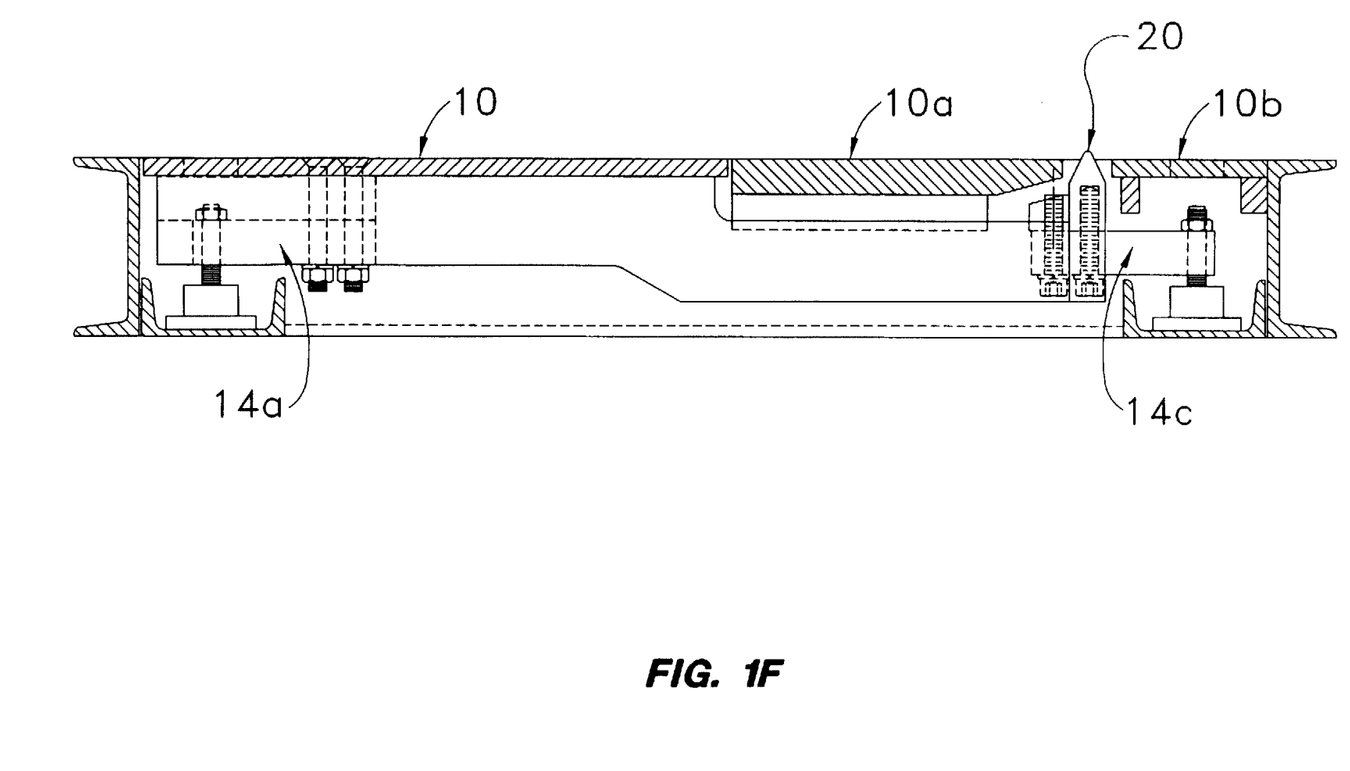
FIG. 1F is a side elevational view of the weight assembly of FIG. 1D with partial cut-aways to show the load cells and feet.

Referring now to FIGS. 1D and 1F, the height of the bar 20 above the road surface might be, for example, ½ inch, preferably 3/16 inch, and the thickness of the bar in the direction of travel might be, for example, ½ inch at its base. The bar 20 may be tapered from its base to a width of 3/16 inch at its top. The bar is longer than the width of the tire so the entire tread width of the tire 30 rolls over the bar 20.

FIGS. 1B, 1C, 1D, 1E and 1F show various views of the invention. Like elements use the same reference numbers throughout.

Figure 4:
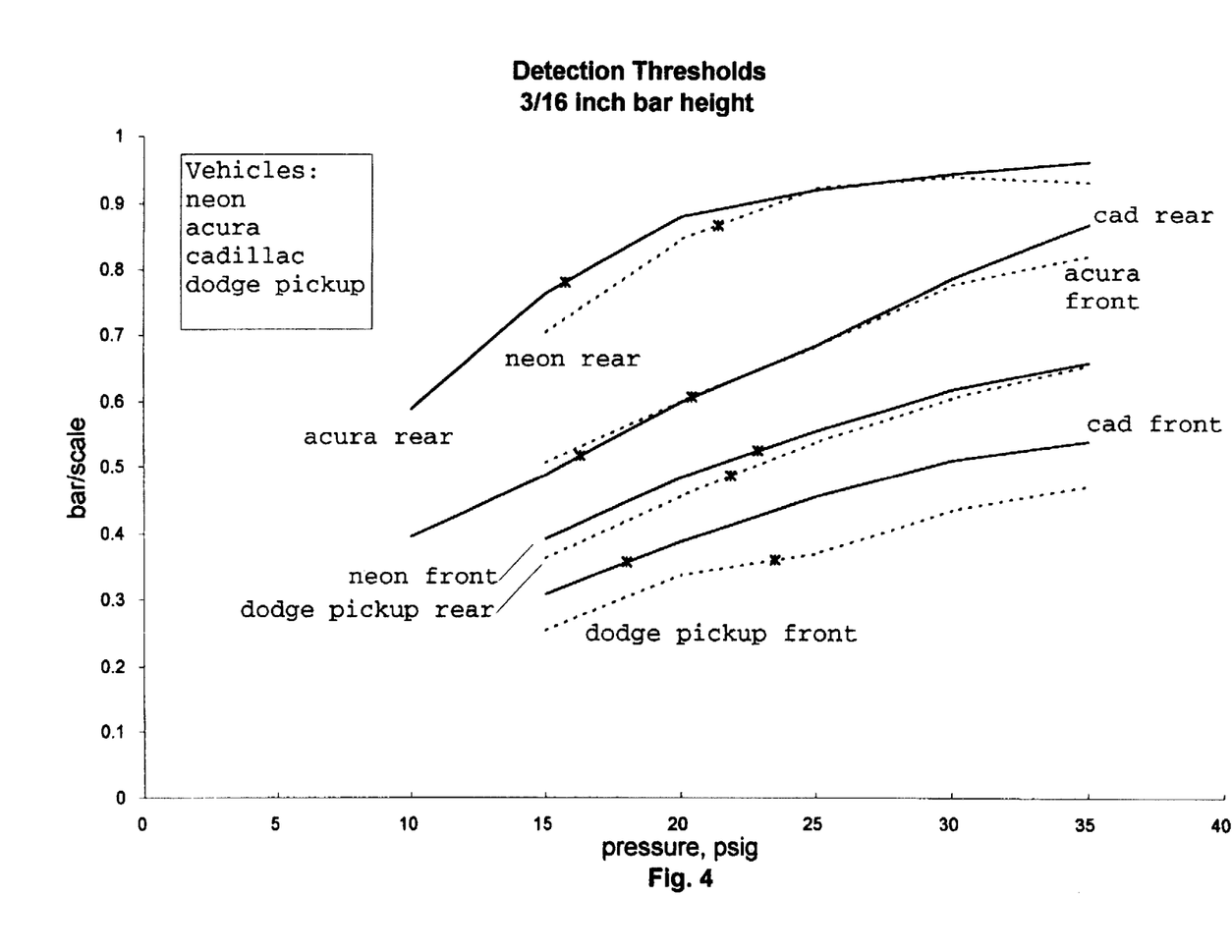
FIG. 4 is a graph of bar:scale weight ratio vs. tire pressure for a wide range of vehicles having a wide range of tire sizes.
Figure 5:
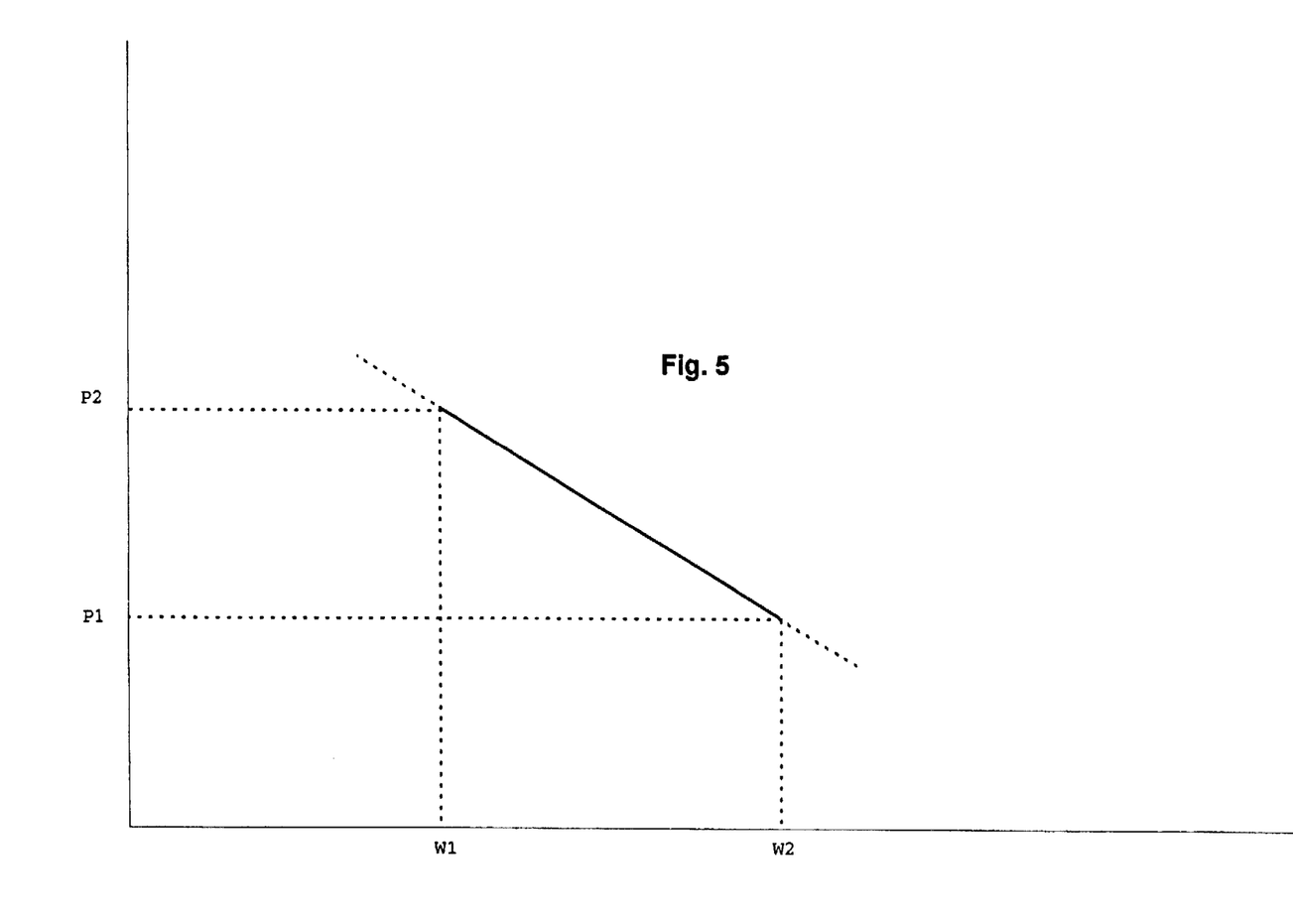
FIG. 5 is a graph, made by using the data from FIG. 4, for determining the weight-dependent threshold for unknown tires.

The relative degree of underinflation is determined from the above measurements. In particular, in the computer 60, the maximum reading X from the bar 20 is divided by the maximum reading Y from the scale 10 to generate "the ratio". This ratio X/Y is, in principle, never greater than one; however, it may vary due to weight shift. When the tire is underinflated, or if the weight on the wheel is sufficiently heavy, some of the weight is taken up by the road surface 12 when the tire is at the top of the bar (as shown in FIG. 2A), thereby reducing weight on the bar 20 below the weight on the scale 10, and therefore reducing the ratio X/Y below a value of one. The amount by which the ratio X/Y is reduced for a given pressure depends on both the tire 30 stiffness and the weight on the tire. It has been found that a useful threshold (called "weight-dependent threshold") for determining underinflation of a particular tire can be set based exclusively on the weight on the tire, without requiring any other knowledge about the tire such as stiffness, size or type so that if the measured ratio X/Y is below the ratio corresponding to the weight-dependent threshold, the tire 30 can be declared to be underinflated. For tires with substantial weight on them, for example, the weight-dependent threshold can be set fairly high, say 27 psi for a tire that is fully inflated at 35 psi. For tires with a light weight (e.g., on the rear of a small car), the weight-dependent threshold could be set as low as, e.g., 13 psi for a tire that is fully inflated at 35 psi. The weight-dependent threshold is determined as follows: FIG. 4 shows curves of the ratio (X/Y) vs. tire pressure for a wide range of vehicles having a wide range of tires installed thereon. For the highest and lowest curves in FIG. 4, the "threshold" pressure is determined for which the ratio X/Y is, say, at least 5 percent below the ratio corresponding to the maximum pressure reading for each curve. This arbitrary pressure is denoted by an "*" on each curve. A line is then fitted to the two points ($P_1W_1$, $P_2W_2$) to fit two threshold pressures as a function of the two tire weights. This resulting curve (equation) is shown in FIG. 5 and is used to set a threshold for user vehicles. The curve is simply extrapolated for tires falling outside the data shown in the highest and lowest curves of FIG. 4.

Instead of a straight line, higher order curves (e.g., quadratic or cubic) may be used by selecting additional points for the intermediate curve.

The result of this analysis is communicated to the vehicle driver, for example, by an electronically controlled display 50, such as a visual message display, computer speech generator or a printer, connected to the computer 60.

Figure 6:
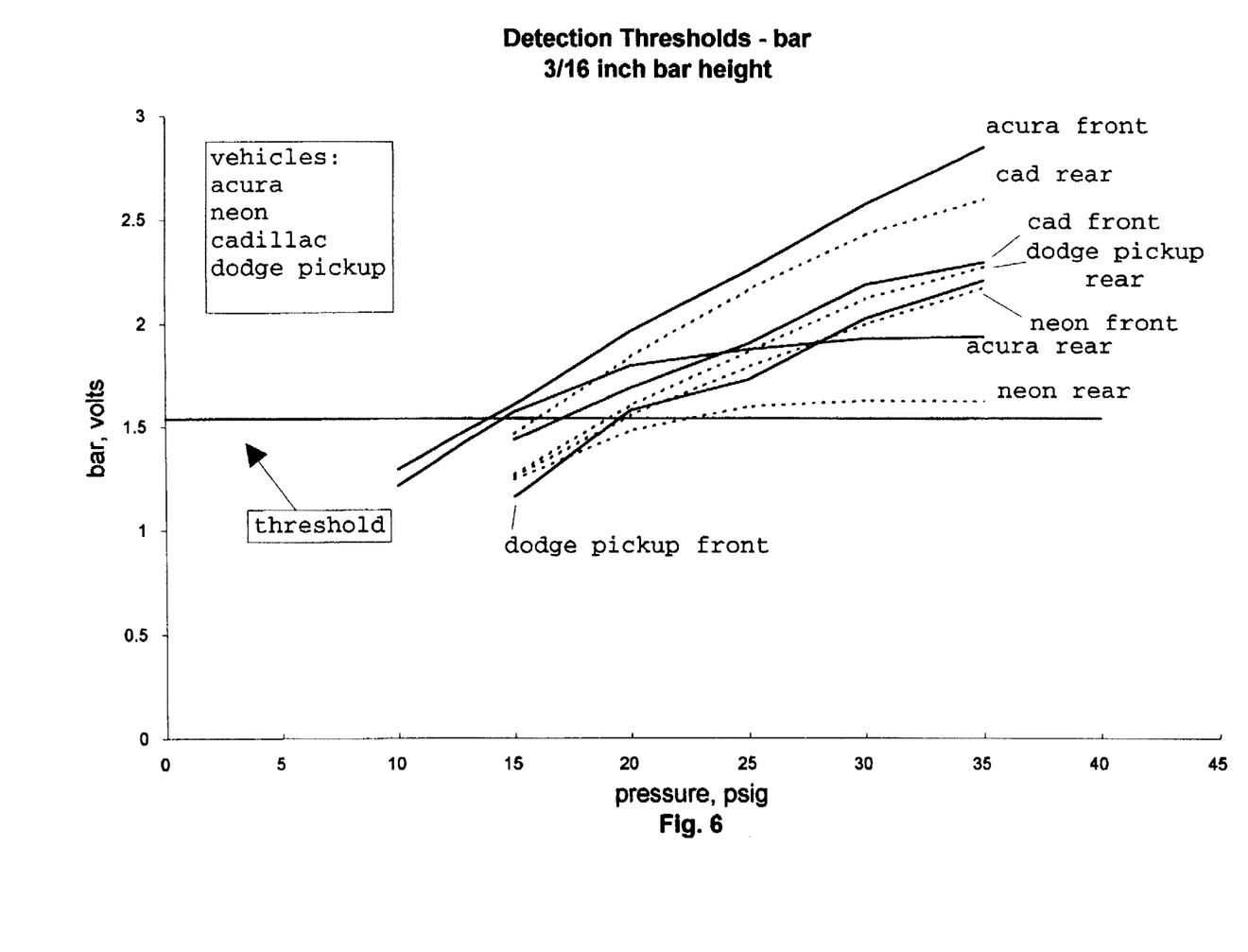
FIG. 6 is a graph, analogous to FIG. 4, of the bar reading vs tire pressure, for the data used in obtaining FIG. 4, showing a simple single-valued threshold independent of weight.
Figure 8:
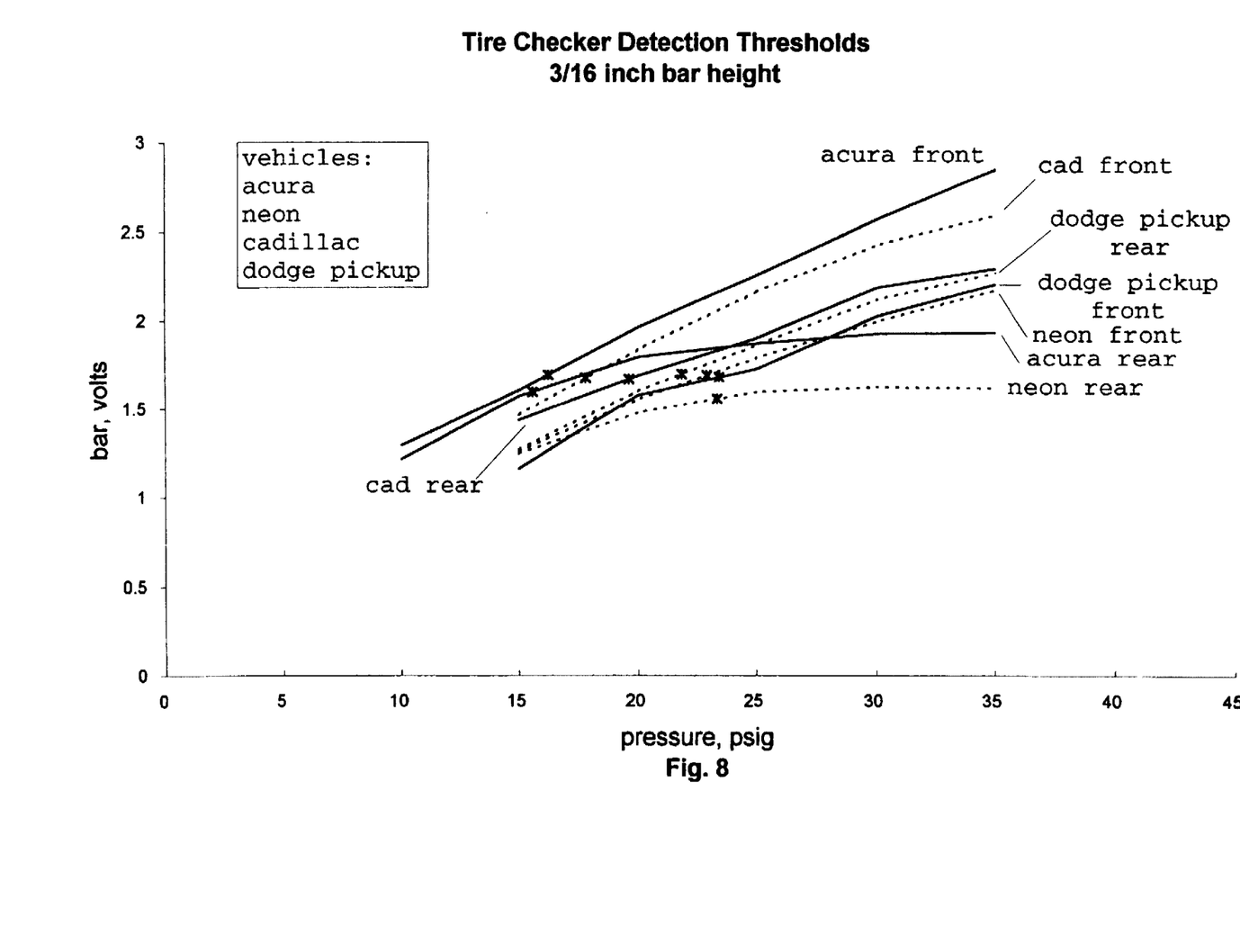
FIG. 8 is a graph, analogous to FIG. 4, of the bar reading vs tire pressure, for data used in obtaining FIG. 4, with a weight-dependent threshold shown.

It will be appreciated that data may be used other than the X/Y ratio calculations. For example, curves analogous to FIG. 4 may be generated using only data corresponding to the weight on the bar 20 and using a single-valued threshold independent of weight. This data is presented in FIG. 6. A curve (not shown) analogous to FIG. 5 may be generated in the same manner using the threshold points of the high and low curves of FIG. 6. As another example, FIG. 8 shows a comparison of bar reading vs pressure, for the data obtained in FIG. 4, with a weight-dependent threshold.

Figure 7:
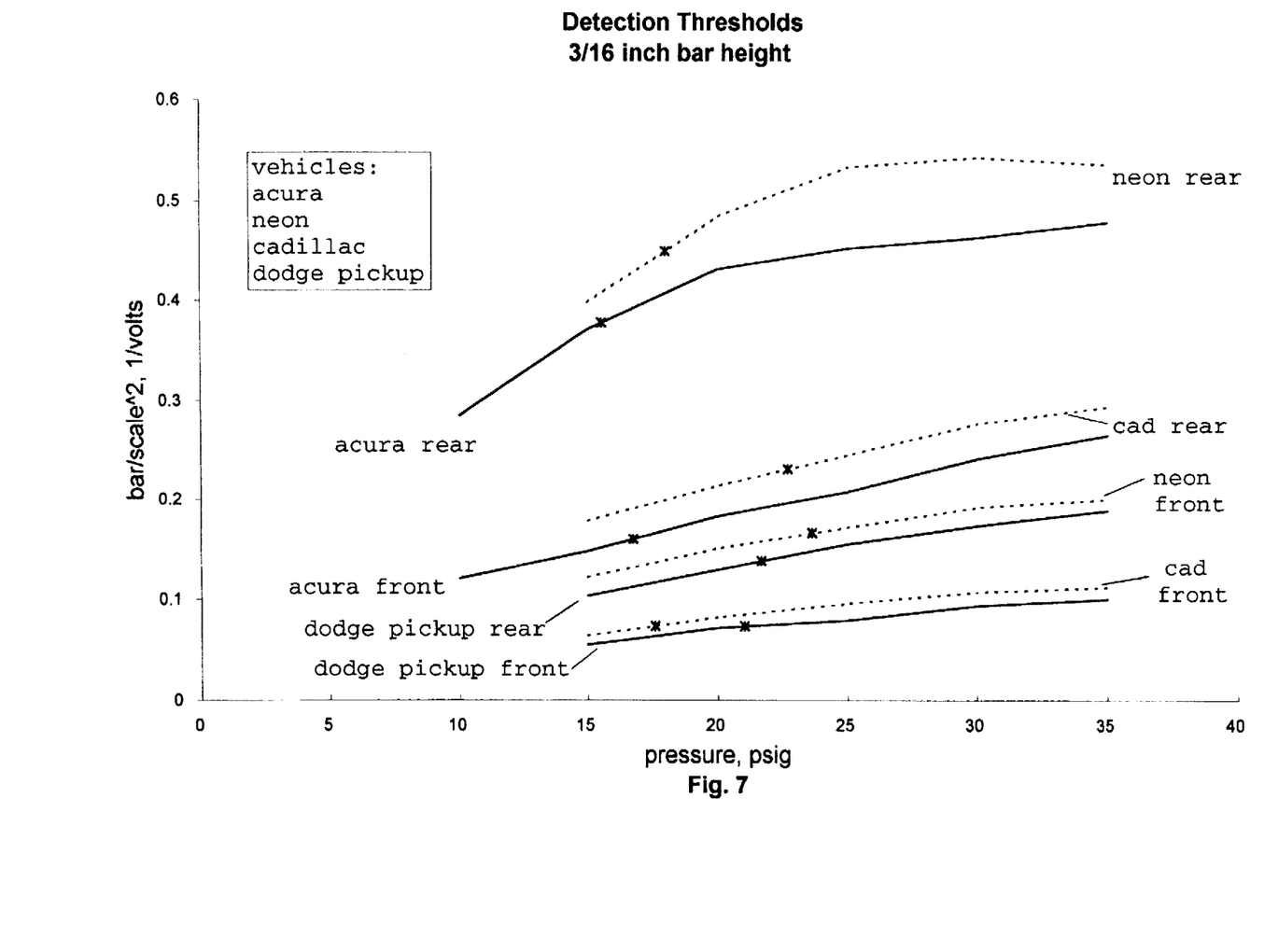
FIG. 7 is a graph, analogous to FIG. 4, of the bar/scale$^2$ reading vs tire pressure for data used in obtaining FIG. 4, with a weight-dependent threshold shown.

The weight ratio, bar/scale, may be generalized to bar/f (scale), where f (scale) is a generalized function of scale weight, for example, a polynomial in scale weight. The preferred implementation is bar/scale$^2$. A threshold for this ratio is determined and applied using the same method as described for the bar/scale ratio. It has been found that bar/scale² allows a wider margin between the threshold and the maximum value of the ratio (typically at 35 psi) than does bar/scale, without increasing the minimum and maximum threshold pressures. FIG. 7 shows a graph of bar/scale² vs pressure including a threshold function.

Figure 9:
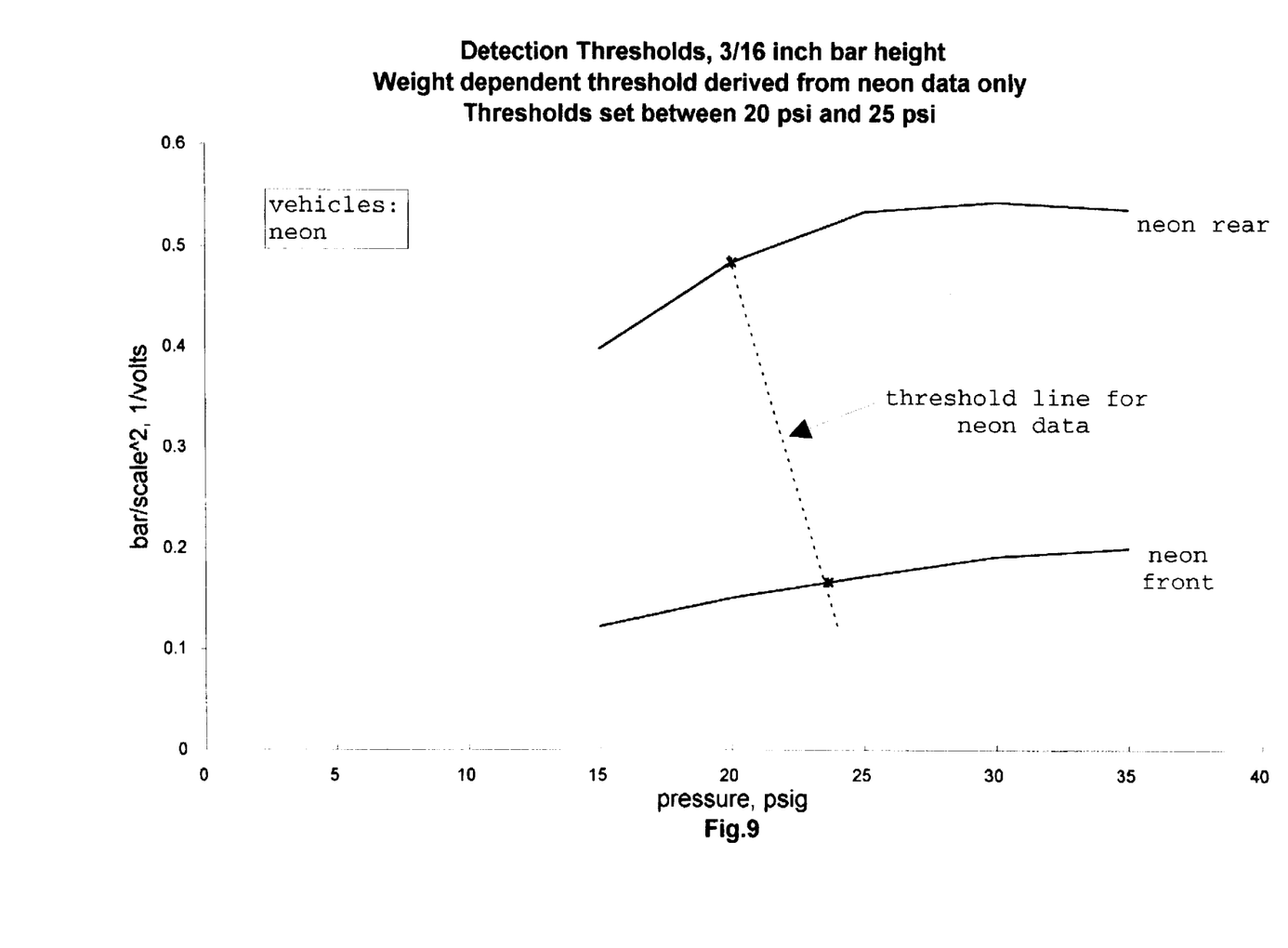
FIG. 9 is a graph, analogous to FIG. 4, of the bar/scale$^2$ reading vs tire pressure for data used in obtaining FIG. 4, with a weight-dependent threshold derived for one type of tire only.

If the type of tire is known to the tire checker, a tire inflation status calculation can be performed for that specific type of tire. An example is shown in FIG. 9, where the threshold has been determined for only one type of tire and set to fall between 20 and 25 psig. Communication of the tire type to the tire checker may be, for example, by manual or speech input, automatically by a wireless transponder in the vehicle, or by an automatic image scanner that reads the tire type directly off the tire. If the tire type is known, the threshold of detection can be set over a smaller range of pressure than if all possible types of tires have to be accommodated.

It will be appreciated that there are many other methods for setting thresholds and calculating tire inflation status from the data collected, which may include the time duration of the top or bottom (say at the 10 percent and 90 percent of peak levels) of each of the four peaks, or other time-related parameters. These methods are generally known as statistical classification methods.

FIG. 3 shows the components used for data acquisition, calculation, and output of results. The load cells 14a–14d generate raw voltage signals. The load cell summer 40 adds together the voltages from the four load cells for each measurement, amplifies the signals from the millivolt range to the volt range and inputs these signals to the computer 60 via A/D converter 45.

The computer 60 receives the load cell summer 40 output via A/D converter 45 which converts the analog voltages from summer 40 to digital outputs for use by the computer and stores it for analysis. The A/D converter 45 may be integral with the computer 60 or may be a separate unit. The computer 60 then determines the peak scale (Y) and bar (X) readings for both the front and rear tires. It then calculates the ratio X/Y, determines the weight-dependent threshold, and determines whether the tire is underinflated. It then communicates the result to the desired output device(s) 50.

FIG. 4 is a graph of the bar:scale (X/Y) weight ratio vs. actual psi (tire pressure) for a group of four vehicles with varying tire sizes. The vehicles and tire sizes are as follows (the vehicles are shown in the order of increasing weight from top to bottom):

TABLE

| Vehicle | Tire Size |
| --- | --- |
| Neon | P185/65 R14 |
| Acura | P195/55R15 |
| Cadillac | P225/60 R16 |
| Dodge Pickup | P225/75 R15 |

The weight-dependent threshold for each set of measurements is denoted by an "*" sign on the curves of FIG. 4. Readings to the left of the "*" signs (i.e., a lower bar:scale ratio) indicate an underinflated tire.

The data used to generate the curves were collected using a Compaq 486/33 computer using National Instruments LabVIEW software. A Z-World Micro-G2C computer programmed using dynamic C language has also been used to collect data and calculate ratios to compare ratios to thresholds, and will be used in commercial embodiments. An amplifier and summing board, Part No. API 4058G4-SUM012, supplied by Absolute Process Instruments, was used with a data acquisition board supplied by National Instruments, Model AT-MIO-16E-10. The load cells used were Rice Lake Weighing Model No. 300000, Part No. 21491 supported by foot assembly shock mounts, Part No. EF2.500, supplied by B-Tek.

What is claimed is:

1. An apparatus for determining the inflation status of a vehicle tire while said tire is attached to said vehicle and said vehicle is moving in a line of travel, comprising:

a scale plate installed in a road surface in said line of travel of said vehicle, said scale plate being supported by at least one load cell which deflects when said tire rolls over said scale plate, said tire having a tread, said tread having a width;

means attached to said at least one load cell for measuring the weight on said scale plate with respect to time;

a deformation bar located in said road surface and supported by at least one load cell, said deformation bar being raised above said road surface and adapted to deform said tire when said tire rolls over said deformation bar;

means attached to said at least one load cell for measuring the weight on said deformation bar with respect to time;

means for comparing a selected weight on said deformation bar with a selected weight on said scale plate and forming a ratio thereof; and means for comparing said ratio with a ratio corresponding to a minimum acceptable inflation pressure for said tire.

2. The apparatus of claim 1 wherein the same load cell is used for the scale weight and the weight on said deformation bar.

3. The apparatus of claim 1 wherein said at least one load cell comprises a plurality of load cells.

4. The apparatus of claim 3 further comprising means attached to each of said plurality of load cells for measuring the weight on said deformation bar and said scale with respect to time.

5. The apparatus of claim 3 wherein said plurality of load cells comprises four load cells.

6. The apparatus of claim 5 further comprising means attached to each of said plurality of load cells for measuring the weight on said deformation bar and said scale with respect to time.

7. The apparatus of claim 3 wherein the same load cells are used for the scale weight and the weight on said deformation bar.

8. The apparatus of claim 5 wherein the same load cells are used for the scale weight and the weight on said deformation bar.

9. The apparatus of claim 1 wherein a second scale plate and deformation bar are installed in said road surface so as to be run over by a different pair of tires.

10. The apparatus of claim 1 wherein said deformation bar is longer than the width of said tire tread.

11. The apparatus of claim 9 wherein said deformation bars are longer than the width of said tire treads.

12. The apparatus of claim 1 wherein said deformation bar is located proximate to said scale plate and in said line of travel of said tire.

13. A method for determining the inflation status of a vehicle tire while said tire is installed on said vehicle, comprising the steps of:

obtaining a first weight by measuring the weight on said tire with respect to time when said tire is rolling on a flat surface;

obtaining a second weight by measuring the weight on said tire with respect to time when said tire rolls over a raised object;

obtaining a ratio by dividing said second weight by said first weight;

determining a weight-dependent threshold for said tire, said weight-dependent threshold corresponding to a minimum acceptable inflation pressure for said tire; and comparing said weight-dependent threshold to said ratio.

14. The method of claim 13 wherein said weight-dependent threshold is obtained by extrapolation of a curve.

15. An apparatus for determining the inflation status of a vehicle tire while said tire is attached to said vehicle and said vehicle is moving in a line of travel, comprising:

a deformation bar supported by at least one load cell, located in a road surface and in said line of travel of said tire, said deformation bar being raised above said road surface and adapted to deform said tire when said tire rolls over said deformation bar, said tire having a tread, said tread having a width;

means attached to said at least one load cell for measuring the weight on said deformation bar with respect to time; and means for comparing a selected weight on said deformation bar with a weight corresponding to a minimum acceptable inflation pressure for said tire.

16. The apparatus of claim 15 wherein said at least one load cell comprises a plurality of load cells.

17. The apparatus of claim 16 wherein said plurality of load cells comprises four load cells.

18. The apparatus of claim 15 wherein a second deformation bar is installed in said road surface so as to be run over by a different pair of tires, said second bar being supported by at least one load cell.

19. The apparatus of claim 15 wherein said deformation bar is longer than said width of said tire tread.

20. The apparatus of claim 18 wherein said deformation bars are longer than said width of said tire tread.

* * * * *